UNITED STATES PATENT OFFICE.

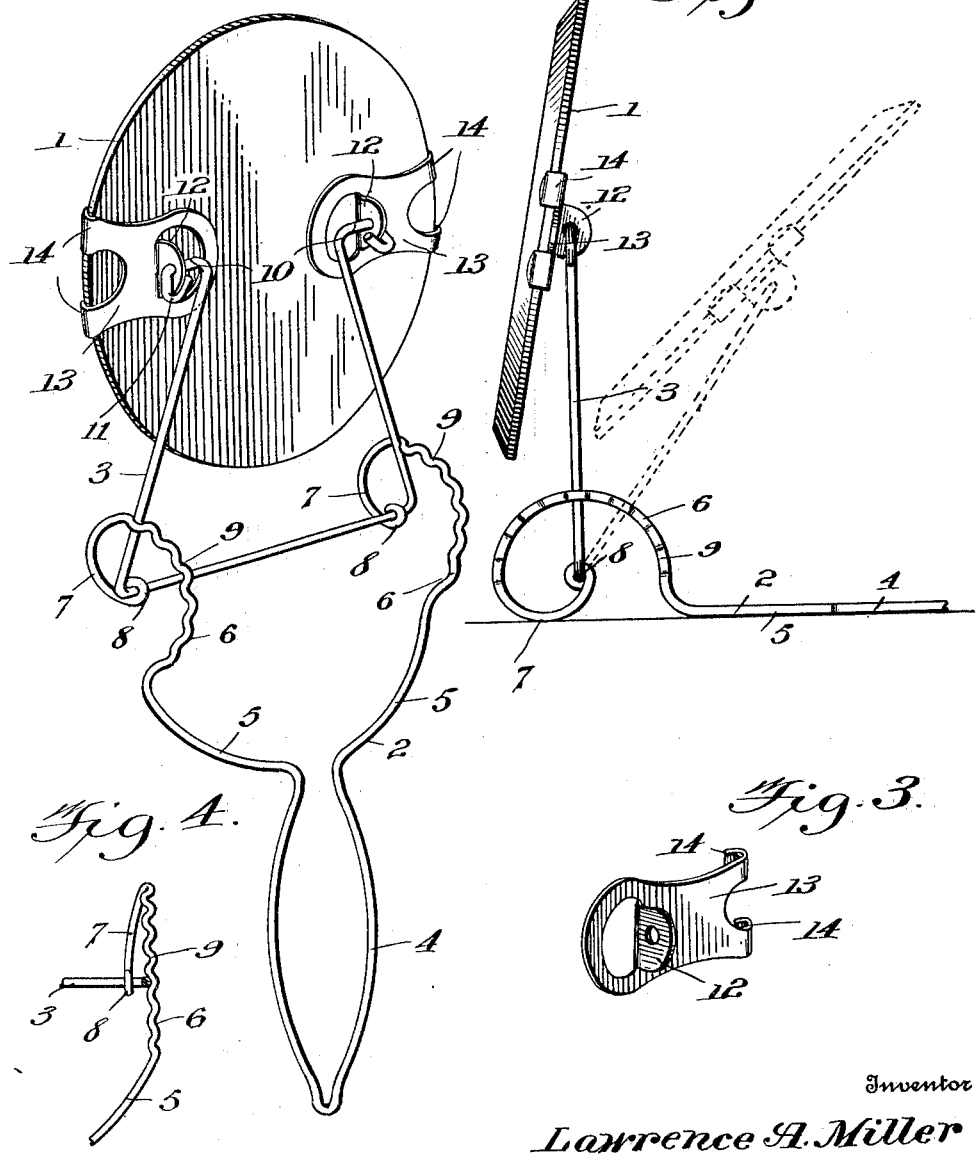

LAWRENCE A. MILLER, OF CARROLL, IOWA.

FOLDING MIRROR-FRAME.

1,113,034.  Specification of Letters Patent.  Patented Oct. 6, 1914.

Application filed January 14, 1914. Serial No. 812,063.

*To all whom it may concern:*

Be it known that I, LAWRENCE A. MILLER, a citizen of the United States, residing at Carroll, in the county of Carroll and State of Iowa, have invented new and useful Improvements in Folding Mirror-Frames, of which the following is a specification.

The invention provides a mirror embodying a sectional frame which admits of the mirror being supported in a variety of positions or held in the hand in the manner of the usual hand mirror, the sectional frame being constructed and connected in a manner to admit of the parts folding upon one another and upon the mirror so as to occupy the smallest amount of space possible to admit of placing it in a hand satchel or other container without occupying valuable space.

The invention consists of two frames having pivotal connection, such frames being provided with means for positively holding them at the required adjusted position, and one of such frames having pivotal connection with the mirror to admit of the latter turning to any angular position and being retained in position against accidental movement.

The invention further consists of the novel features, details of construction and combination of parts which hereinafter will be more particularly set forth illustrated and claimed.

In the drawings hereto attached:—Figure 1 is a perspective view of a mirror embodying the invention as seen from the rear, the frames being extended and the mirror occupying a position in a plane parallel with the plane of the alined frames, the arrangement being such as to admit of the mirror being suspended from the wall or held in the hand. Fig. 2 is a side view of the mirror showing the parts arranged for sustaining the mirror upon a table or like supporting surface. Fig. 3 is a detail view of one of the mirror clips. Fig. 4 is a detail view of the supporting frame.

Corresponding and like parts are referred to in the following description, and indicated in all the views of the drawing, by the same reference characters.

The numeral 1 designates a mirror or like part which may be of any outline and construction. The supporting means for the mirror comprises two frames 2 and 3 which are pivotally connected to each other and to the mirror. The frame 2 designated as the supporting frame to distinguish from the frame 3, which is designated as the mirror frame, is preferably constructed of wire of suitable gage to provide a substantial part and spring members. The supporting frame consists of a loop 4, offset 5, segments 6, and reëntrant arms 7, which terminate in eyes 8 to receive an end member of the mirror frame 3 whereby the two frames are pivotally connected. The segments 6 are approximately of semicircular form and each is formed with a plurality of crimps 9 which are adapted to engage with the side members of the mirror frame and hold the two frames positively in the adjusted position. The segments 6 are in parallel planes and the eyes 8 occupy a position concentric with such segments. The reëntrant arms 7 converge toward their extremities to throw the eyes 8 inside of the planes of the segment 6 so as to provide ample clearance for the side members of the mirror frame. The frame 2 may be suspended from a nail or like device driven into the wall, partition or analogous support. The side members of the supporting frame are adapted to yield and possess a certain amount of spring action which serves to hold the crimps of the segment 6 in positive engagement with the side members of the mirror frame 3.

The mirror frame 3 is constructed of a single length of spring wire of suitable gage and is preferably of triangular form, the side members having their end portions bent outwardly to form journals 10 which terminate in eyes to engage ears 12 projecting rearwardly from the mirror 1. The end member of the frame 3 remote from the journals 10 is supported in the eyes 8 of the supporting frame 2. The side members of the frame 3 are adapted to engage the crimps 9 of the supporting frame and thereby hold the mirror frame in the required adjusted position. As indicated in Fig. 1 the two frames 2 and 3 may be extended so as to aline, thereby admitting of the mirror being held in the hand in the usual way or suspended by means of the loop 4 from a nail or like device. As indicated in Fig. 2 the frame 3 may be turned to occupy any desired angular position with reference to the frame 2 and the latter may be placed upon a table or other article of furniture or like supporting surface. Two clips 13 are fitted to opposite sides of the mirror and each is formed with an ear 12. The clips have loops 14 at their outer ends to engage the edges of the mirror. The ears 12 are partly cut from the blanks forming the clips and are pressed outwardly. The clips may be readily fitted to or disconnected from the mirror and when in position are drawn inward by the spring action of the side members comprising the mirror frame. The eyes 11 engage the ears 12 frictionally in such a manner as to hold the mirror in the required angular position. The frictional contact between the eyes 11 and ears 12 is supplemented by the frictional engagement of the journals 10 with the clips, with the result that the mirror is retained in any adjusted angular position.

It will be understood from the foregoing taken in connection with the accompanying drawing that the invention provides a mirror which may be held in the hand, suspended upon the wall or placed upon a table or other supporting surface and which in any position may be adjusted to any angle that may be required. It is also noted that the device is of such formation as to admit of the parts folding readily into a flat and compact form for storing when the article is not required for immediate use.

From the foregoing description, taken in connection with the accompanying drawing, the advantages of the construction and of the method of operation will be readily apparent to those skilled in the art to which the invention appertains, and while I have described the principle of operation of the invention together with the device which I now consider to be the best embodiment thereof, I desire to have it understood that the device shown is merely illustrative, and that such changes may be made when desired as are within the scope of the invention as claimed.

Having thus described the invention what is claimed as new is:—

1. Supporting means for a mirror or like part, the same comprising two frames, one of such frames embodying spring side members, each of such members having a crimped segment, a reëntrant arm and an eye at the extremity of such arm and the other frame being pivotally supported in the eyes of the first mentioned frame and extending along the inner sides of the crimped members and engaging the crimps thereof to hold the two frames in the adjusted position.

2. In supporting means for a mirror or analogous part, a frame formed of a single wire and comprising a loop, offsets, crimped segments and reëntrant arms terminating in eyes concentric with the segments, said reëntrant arms converging toward the ends formed into the eyes, and a second frame of substantially triangular form pivotally supported in the eyes of the first mentioned frame and having its side members adapted to engage the crimps of the segments to hold the two frames in the required angular position.

3. In combination with a mirror or like part, clips having hooks at their outer ends for engaging opposite edges of the mirror and provided with offstanding ears and a frame comprising side members having their end portions bent laterally to provide journals which terminate in eyes, the latter engaging the ears of the clips and the journals engaging the said clips, said frame serving to hold the clips in position, and the frictional engagement of the parts acting to hold the mirror in the angular adjusted position.

In testimony whereof I affix my signature in presence of two witnesses.

LAWRENCE A. MILLER.

Witnesses:
  LENORE E. OSTEN,
  H. B. ANDERSON.

---

Copies of this patent may be obtained for five cents each, by addressing the "Commissioner of Patents, Washington, D. C."